US012659430B2

(12) United States Patent
Dice et al.

(10) Patent No.: US 12,659,430 B2
(45) Date of Patent: \*Jun. 16, 2026

(54) WEB SERVICE CLIENT CONTAINER

(71) Applicant: Dice Corporation, Bay City, MI (US)

(72) Inventors: Clifford Dice, Midland, MI (US);
Gerald Corrion, Bay City, MI (US)

(73) Assignee: Dice Corporation, Bay City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,564

(22) Filed: Feb. 13, 2024

(65) Prior Publication Data

US 2024/0187660 A1    Jun. 6, 2024

Related U.S. Application Data

(63) Continuation of application No. 16/542,693, filed on Aug. 16, 2019, now abandoned.

(Continued)

(51) Int. Cl.
*H04N 7/18* (2006.01)
*H04L 65/1023* (2022.01)
(Continued)

(52) U.S. Cl.
CPC ......... *H04N 7/181* (2013.01); *H04L 65/1023* (2013.01); *H04L 65/1045* (2022.05);
(Continued)

(58) Field of Classification Search
CPC .............. H04N 21/231; H04N 21/218; H04N 21/4147; H04N 21/4223; H04N 23/631;
(Continued)

(56) References Cited

U.S. PATENT DOCUMENTS 6,954,859 B1    10/2005  Simerly et al.
7,685,292 B1    3/2010   Kinsella et al.
(Continued)

FOREIGN PATENT DOCUMENTS

WO    2001084839 A1    11/2001
WO    2019043687 A2    3/2019

OTHER PUBLICATIONS

Jabeen et al., "Security System Using an IP Camera in Cloud Computing", 2017, 5 pages.
(Continued)

*Primary Examiner* — Kamal M Hossain
(74) *Attorney, Agent, or Firm* — Brooks Kushman P.C.

(57) ABSTRACT

A product comprising a network management computer system comprising at least one computer having non-transitory memory configured to store machine instructions that are to be executed by the at least one computer. The machine instructions when executed by the computer implement the following web service client functions: receiving a data request at a cloud instance from a data recorder container residing on the cloud instance; upon receiving the data request, requesting a tunnel from a web service proxy; receiving an offer of the tunnel from the web service proxy; and opening a listening port to transmit traffic between a network device at a client site and the data recorder container using an Internet connection without a firewall.

15 Claims, 15 Drawing Sheets

Related U.S. Application Data

(60) Provisional application No. 62/735,631, filed on Sep. 24, 2018.

(51) Int. Cl.

| | |
|---|---|
| *H04L 65/1045* | (2022.01) |
| *H04L 65/1069* | (2022.01) |
| *H04L 65/1101* | (2022.01) |
| *H04L 65/61* | (2022.01) |
| *H04L 65/65* | (2022.01) |
| *H04L 67/02* | (2022.01) |
| *H04L 67/12* | (2022.01) |
| *H04L 67/56* | (2022.01) |
| *H04N 21/218* | (2011.01) |
| *H04N 21/231* | (2011.01) |
| *H04N 21/4147* | (2011.01) |
| *H04N 21/4223* | (2011.01) |
| *H04N 23/60* | (2023.01) |
| *H04N 23/63* | (2023.01) |
| *H04N 23/661* | (2023.01) |
| *H04L 9/40* | (2022.01) |
| *H04L 67/51* | (2022.01) |
| *H04N 21/274* | (2011.01) |
| *H04N 21/647* | (2011.01) |

(52) U.S. Cl.
CPC ...... *H04L 65/1069* (2013.01); *H04L 65/1101* (2022.05); *H04L 65/61* (2022.05); *H04L 65/65* (2022.05); *H04L 67/02* (2013.01); *H04L 67/12* (2013.01); *H04L 67/56* (2022.05); *H04N 21/218* (2013.01); *H04N 21/231* (2013.01); *H04N 21/4147* (2013.01); *H04N 21/4223* (2013.01); *H04N 23/631* (2023.01); *H04N 23/64* (2023.01); *H04N 23/661* (2023.01)

(58) Field of Classification Search
CPC .... H04N 23/64; H04N 23/661; H04N 21/274; H04N 21/64715; H04N 21/64738; H04N 7/181; H04L 65/1023; H04L 65/1045; H04L 65/1069; H04L 65/1101; H04L 65/61; H04L 65/65; H04L 67/02; H04L 67/12; H04L 67/56; H04L 63/0272; H04L 63/0281; H04L 67/51
See application file for complete search history.

References Cited (56)

U.S. PATENT DOCUMENTS

| | | | |
|---|---|---|---|
| 8,205,240 | B2 | 6/2012 | Ansari et al. |
| 9,722,972 | B2 | 8/2017 | Ahmed et al. |
| 10,205,913 | B2 | 2/2019 | Smith et al. |
| 10,243,997 | B2 | 3/2019 | Desai et al. |
| 10,785,511 | B1 * | 9/2020 | Lopez Hernandez . H04N 23/61 |
| 11,363,313 | B2 * | 6/2022 | Dice ...................... H04L 65/65 |
| 2001/0043571 | A1 | 11/2001 | Jang et al. |
| 2004/0028009 | A1 | 2/2004 | Dorenbosch et al. |
| 2004/0028391 | A1 | 2/2004 | Black et al. |
| 2008/0288986 | A1 | 11/2008 | Foster et al. |
| 2009/0316709 | A1 | 12/2009 | Polcha et al. |
| 2011/0280540 | A1 | 11/2011 | Woodman |
| 2012/0098969 | A1 * | 4/2012 | Wengrovitz .......... H04N 7/185 |
| | | | 348/E7.085 |
| 2012/0162445 | A1 | 6/2012 | Kim et al. |
| 2013/0198829 | A1 * | 8/2013 | Bund ................... H04L 63/029 |
| | | | 726/11 |
| 2014/0232874 | A1 | 8/2014 | Meyer |
| 2015/0022666 | A1 | 1/2015 | Kay et al. |
| 2015/0188949 | A1 | 7/2015 | Mahaffey et al. |
| 2015/0326512 | A1 | 11/2015 | Chiu |
| 2015/0326513 | A1 | 11/2015 | Chiu |
| 2015/0339136 | A1 | 11/2015 | Suryanarayanan et al. |
| 2016/0036944 | A1 | 2/2016 | Kitchen et al. |
| 2016/0125245 | A1 | 5/2016 | Saitwal et al. |
| 2016/0127691 | A1 | 5/2016 | Bokowski et al. |
| 2017/0039841 | A1 | 2/2017 | Wilson et al. |
| 2017/0070361 | A1 | 3/2017 | Sundermeyer et al. |
| 2017/0118127 | A1 | 4/2017 | Finkelstein |
| 2018/0144263 | A1 * | 5/2018 | Saxena ................. G06F 9/542 |
| 2018/0197387 | A1 | 7/2018 | Dawes |
| 2018/0213296 | A1 | 7/2018 | Kellar |
| 2018/0219976 | A1 | 8/2018 | Decenzo et al. |
| 2018/0270066 | A1 | 9/2018 | Doyon et al. |
| 2019/0163559 | A1 | 5/2019 | Takahashi et al. |
| 2020/0099727 | A1 | 3/2020 | Dice et al. |
| 2020/0099849 | A1 | 3/2020 | Dice et al. |
| 2020/0099961 | A1 | 3/2020 | Dice et al. |
| 2020/0356618 | A1 | 11/2020 | Shribman et al. |
| 2023/0388383 | A1 | 11/2023 | Venkatesh et al. |

OTHER PUBLICATIONS

Ubl et al., "Introducing WebSockets: Bringing Sockets to the Web," 2010, https://www.html5rocks.com/en/tutorials/websockets/basics/.
Final Office Action in U.S. Appl. No. 16/578,552, issued Jul. 2, 2021, 28 pages.

* cited by examiner (A)

Figure 7B:
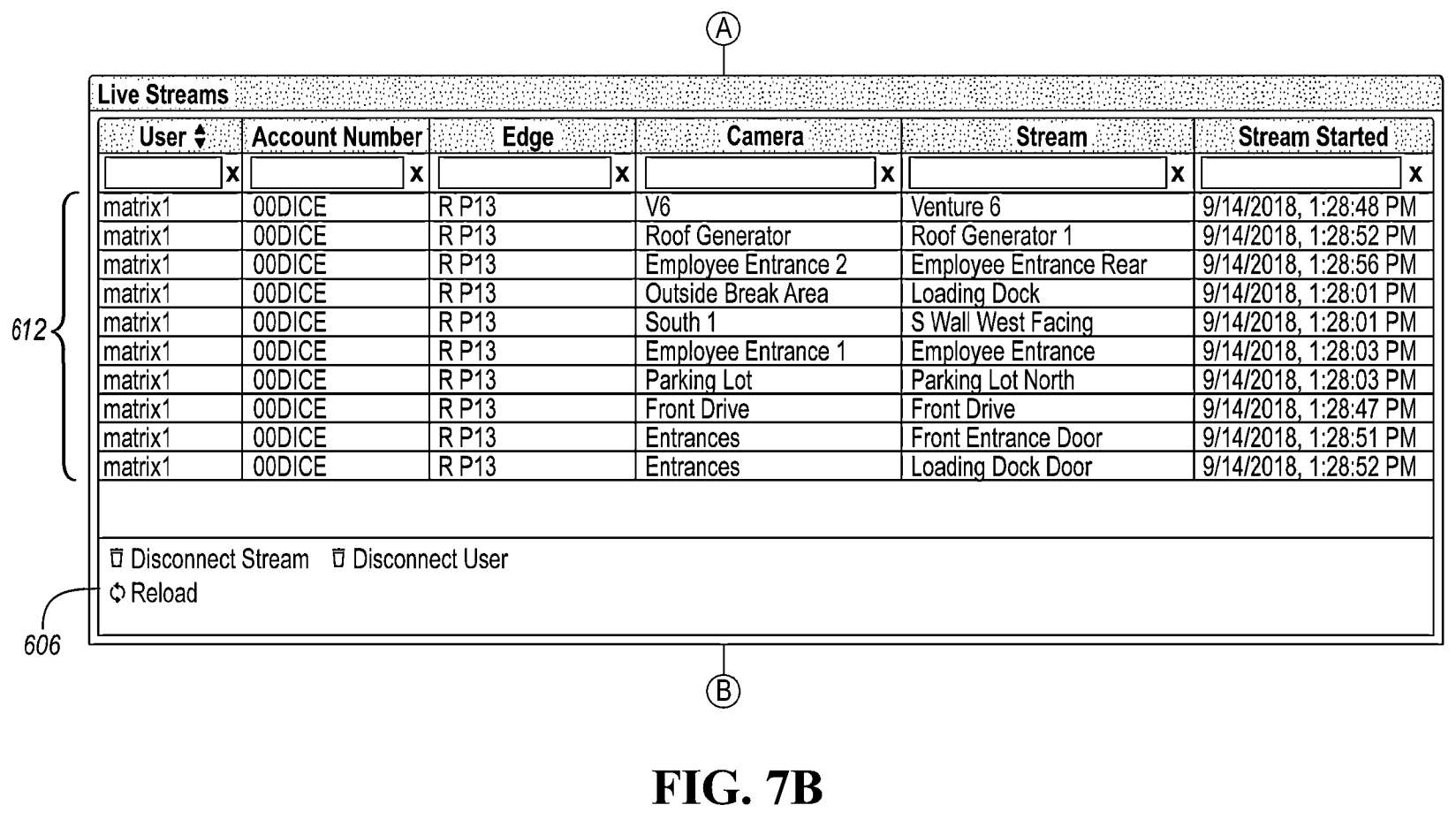

| Live Streams | | | | | | |
|---|---|---|---|---|---|---|
| User ⬥ | Account Number | Edge | Camera | Stream | Stream Started |
| [x] | [x] | [x] | [x] | [x] | [x] | [x] |
| matrix1 | 00DICE | R P13 | V6 | Venture 6 | 9/14/2018, 1:28:48 PM |
| matrix1 | 00DICE | R P13 | Roof Generator | Roof Generator 1 | 9/14/2018, 1:28:52 PM |
| matrix1 | 00DICE | R P13 | Employee Entrance 2 | Employee Entrance Rear | 9/14/2018, 1:28:56 PM |
| matrix1 | 00DICE | R P13 | Outside Break Area | Loading Dock | 9/14/2018, 1:28:01 PM |
| matrix1 | 00DICE | R P13 | South 1 | S Wall West Facing | 9/14/2018, 1:28:01 PM |
| matrix1 | 00DICE | R P13 | Employee Entrance 1 | Employee Entrance | 9/14/2018, 1:28:03 PM |
| matrix1 | 00DICE | R P13 | Parking Lot | Parking Lot North | 9/14/2018, 1:28:03 PM |
| matrix1 | 00DICE | R P13 | Front Drive | Front Drive | 9/14/2018, 1:28:47 PM |
| matrix1 | 00DICE | R P13 | Entrances | Front Entrance Door | 9/14/2018, 1:28:51 PM |
| matrix1 | 00DICE | R P13 | Entrances | Loading Dock Door | 9/14/2018, 1:28:52 PM |

⧉ Disconnect Stream   ⧉ Disconnect User
↻ Reload

Recorders (30/32 Used)

| Account Number | Edge | Camera | Stream | Recorder Started | Recording Started | Tags | Thumbnail |
|---|---|---|---|---|---|---|---|
| [ x ] | [ x ] | [ x ] | [ x ] | [ x ] | [ x ] | [ x ] | [ x ] |
| 00DICE | R P13 | Roof Generator | Roof Generator 2 | 09/12/2018, 15:33:25 | 09/12/2018, 15:33:35 | | |
| 00DICE | R P13 | South 1 | South Wall West Facing | 09/14/2018, 12:34:41 | 09/14/2018, 12:35:38 | | |
| 00DICE | R P13 | Outside Break Area | Employee Entrance Side | 09/13/2018, 16:31:26 | 09/13/2018, 16:31:35 | | |
| 00DICE | R P13 | Entrances | Front Entrance Door | 09/12/2018, 15:32:11 | 09/12/2018, 15:32:19 | | |

Manage All Tags   Manage Stream Tags
Reload

614

600

608

Ⓐ

CVR Bandwidth

| Stream | 2018-09-13 | 2018-09-14 |
|---|---|---|
| ⊟ a41437546fb3: Front Drive | ✗ | ✗ |
| 11: Front Drive | 240.4 MB | 89.7 MB |
| ⊟ acc8e024797: V6 | | |
| 1: Venture 6 | 146.2 MB | 109.1 MB |
| ⊟ acc8e347d90: Loading Dock | | |
| 23: Loading Dock Door | 144.7 MB | 97.1 MB |
| 24: Warehouse/Dock Freight Door | 179.1 MB | 113.1 MB |
| 55: Warehouse/Dock Door | 266.2 MB | 345.2 MB |
| 22: Semi Dock | 169.5 MB | 119.7 MB |
| ⊟ acc8e657b58: Entrances | | |
| 12: Front Entrance Door | 231.2 MB | 135.9 MB |
| 13: Loading Dock Door | 271.9 MB | 171.1 MB |

WEB SERVICE CLIENT CONTAINER

CROSS-REFERENCE TO RELATED APPLICATIONS

This application is a continuation of U.S. application Ser. No. 16/542,693, filed Aug. 16, 2019, which claims the benefit of U.S. Provisional Application No. 62/735,631, filed Sep. 24, 2018.

TECHNICAL FIELD

This technology relates to a web service client container.

BACKGROUND

Networked video management systems exist to facilitate the streaming, recording and viewing of video data over a network. Many of these systems may include a network video recorder (NVR) or a digital video recorder (DVR). An NVR may be a software application that records video data on a digital medium. NVRs may be typically executed on a dedicated computer device embedded with a digital medium configured to store the NVR and recorded video data, and a processor to execute the NVR. A DVR may be a hardware device that records video data on a digital medium included on the hardware device. While NVRs connected directly to a video capture camera or tuner, a DVR may be connected to a network. A DVR encodes video data while an NVR receives processed and encoded video data for a network camera device. NVRs and DVRs may be commonly deployed in video surveillance systems.

SUMMARY

In one embodiment, a product comprising a network management computer system is disclosed that comprises at least one computer having non-transitory memory configured to store machine instructions that are to be executed by the at least one computer. The machine instructions when executed by the computer implement the following web service client functions: receiving a data request at a cloud instance from a data recorder container residing on the cloud instance; upon receiving the data request, requesting a tunnel from a web service proxy; receiving an offer of the tunnel from the web service proxy; and opening a listening port to transmit traffic between a network device at a client site and the data recorder container using an Internet connection without a firewall.

In another embodiment, a method is disclosed. The method includes receiving at a cloud instance a data request from a data recorder container residing on a server network management computer system in the cloud instance; upon receiving the data request, requesting a tunnel from a web service proxy residing on the server network management computer system in the cloud instance; receiving an offer of the tunnel from the web service proxy; and opening a listening port to transmit traffic between a network device at a client site and the data recorder container using an Internet connection without a firewall.

BRIEF DESCRIPTION OF THE DRAWINGS

FIGS. 7A, 7B, and 7C depict a GUI for displaying a dashboard including information to analyze and restore installed network cameras and monitor access to installed video cameras.

FIGS. 8A and 8B depict a GUI for displaying bandwidth information to identify potential network traffic issues on the video management system and to manage data usage on the video management system.

DETAILED DESCRIPTION

NVRs and DVRs may be commonly used in network video management systems. These systems may be commonly deployed in video surveillance systems. As part of the deployment, the NVRs and/or DVRs (with associated hardware) may be installed at the surveillance site and may be configured to store video data on the devices at the site. On-site storage of video data may be relatively expensive because of infrastructure and maintenance costs associated with NVRs and DVRs. Moreover, there may be difficulties viewing the stored video data remotely from NVRs and DVRs.

The following variations may be drawn to a networked video management system that may include a video client application that may be executed from a video gateway device, typically residing at a client site, such as, a video surveillance site. The video client application may be configured to transmit video data from the video gateway device to a cloud instance. The video data may be transmitted to the cloud instance through a secure hypertext transfer protocol (HTTPS) connection.

Figure 1A:
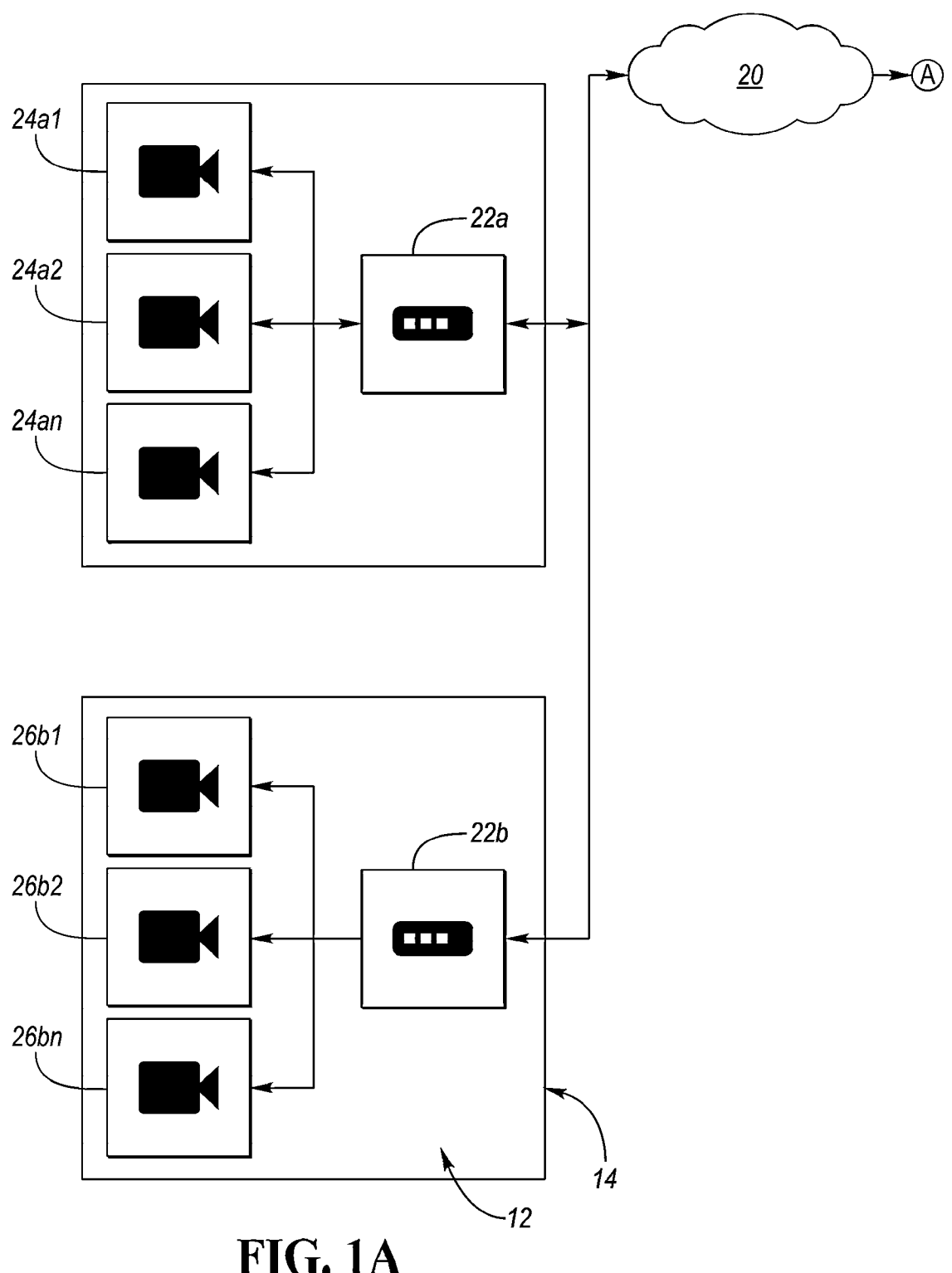
FIGS. 1A, 1B, and 1C depict a computer architecture for a video management system according to one variation.
Figure 1B:
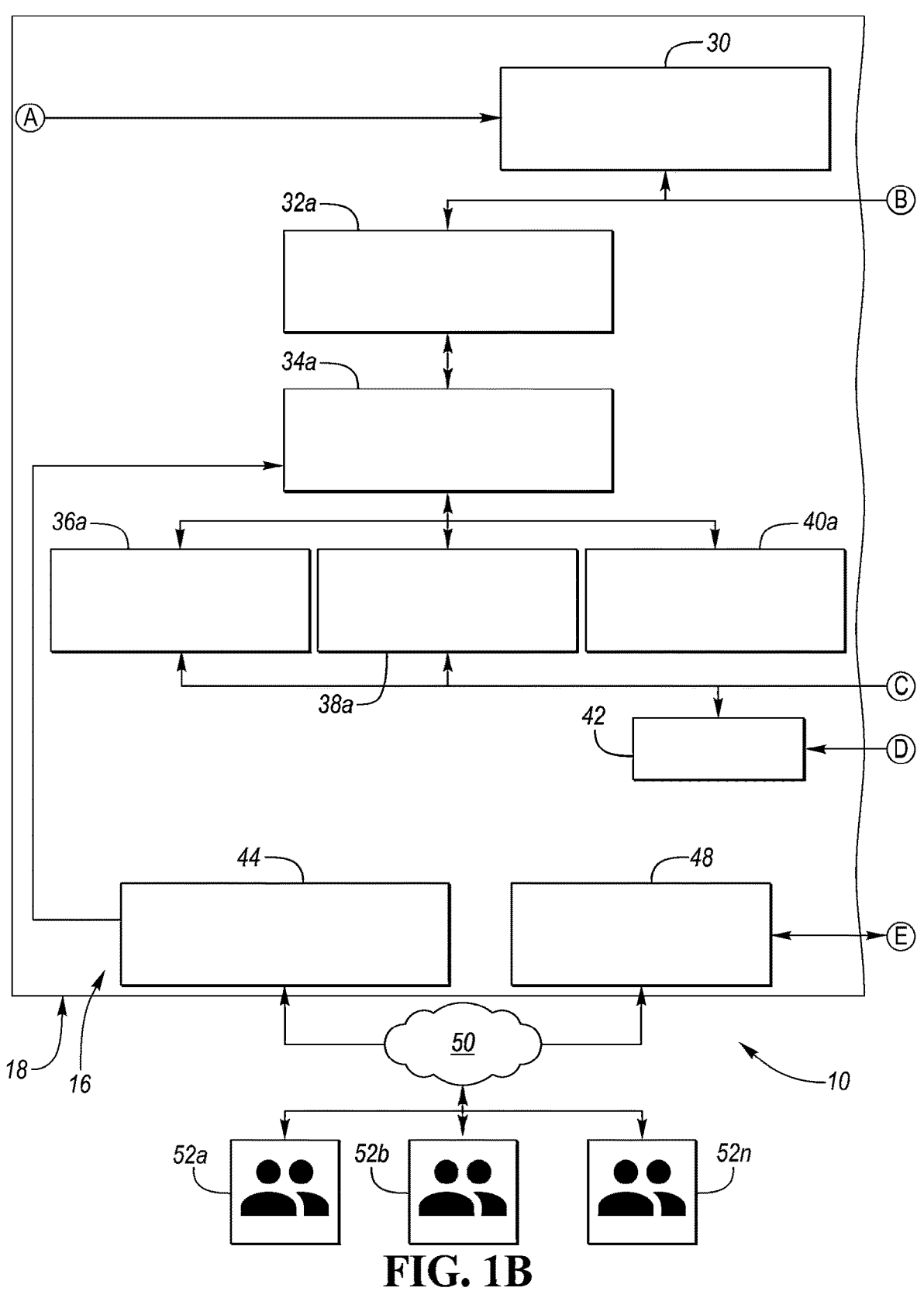
Figure 1C:
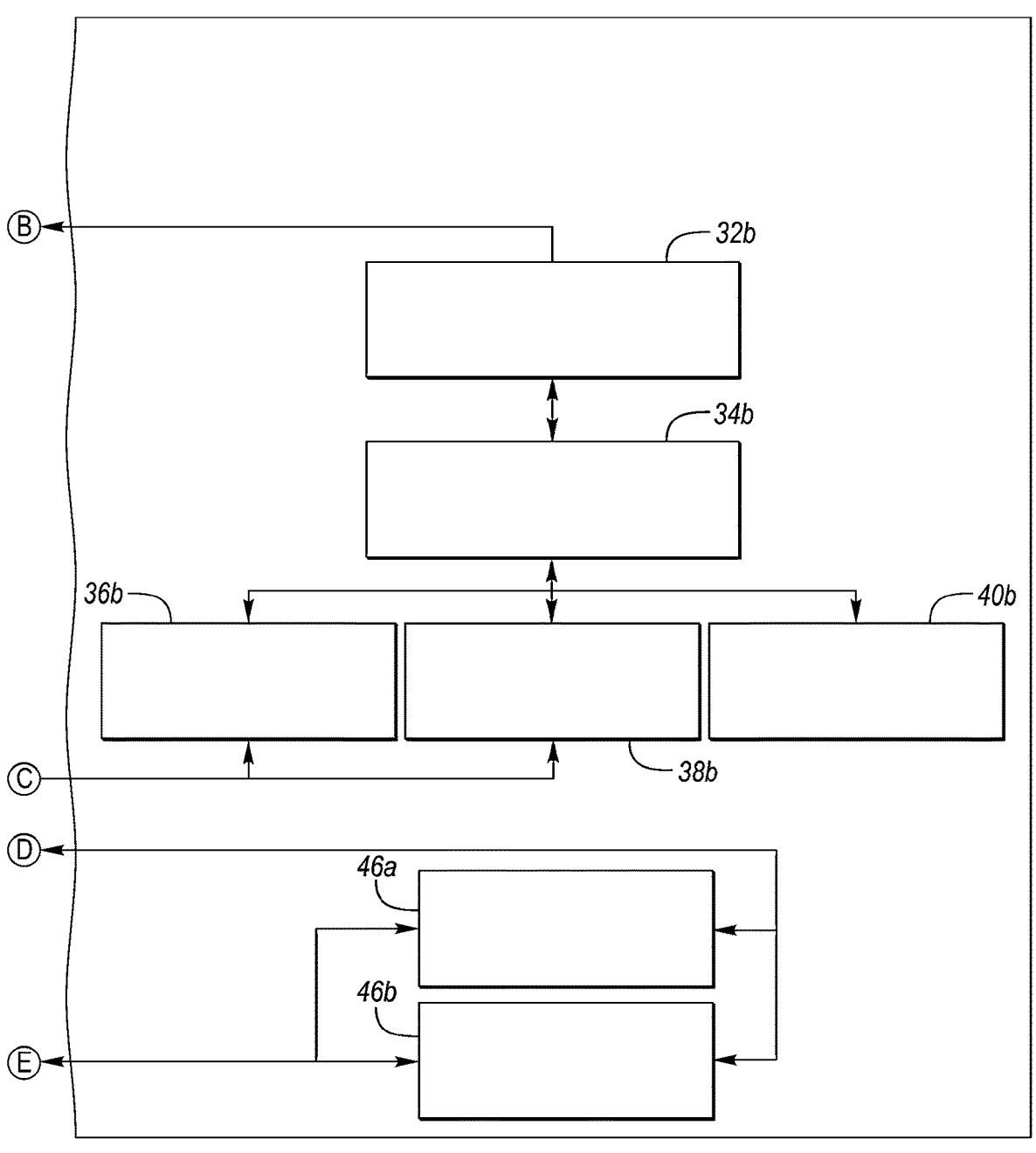

FIGS. 1A, 1B, and 1C depict a computer architecture for a networked video management system 10 according to one variation. The video management system 10 may include a client network 12 residing at a client site 14. The video management system 10 also may include server network 16 virtually residing on a cloud instance 18. Server network 16 may also reside on a bare or a virtual machine. Client and server network 12 and 16 communicate with each other over external communication network 20.

As shown in FIGS. 1A, 1B, and 1C, client network 12 may include first and second video gateway devices 22a and 22b. Each video gateway device 22a and 22b may be a hardware device that may be configured to act as a gate between client network 12 and server network 16 to enable network traffic, including streaming video data traffic, to flow in and out of each network 12 and 16. While two video gateway devices 22a and 22b may be shown in FIGS. 1A, 1B, and 1C, the number of video gateway devices may be significantly scalable. In certain variations, the number of video gateway devices may be only limited by the available provisioned cloud resources. The number may be about 10,000. The number may be exceeded with the implementation of network load balancing.

Each video gateway device 22a and 22b may be config- ured to communicate between networks 12 and 16 using one or more protocols. Network cameras 24a1, 24a2 and 24an may be connected to video gateway device 22a. Network cameras 26b1, 26b2 and 26bn may be connected to video gateway device 22b. While three network cameras may be shown connected to each of video gateway devices 22a and 22b, the number of network cameras connected to each may be significantly scalable. The number of network cameras may only be limited based on hardware specifications and operating system limitations. The number may be about 100 using a relatively low powered device. In one variation, a network camera may include, without limitation, a lens, an image sensor, a processor, and memory. The memory may be configured to store firmware and video data, e.g., video sequence recordings. The firmware may include computer instructions that perform functions when the instructions may be executed by the process. These functions may include, without limitation, networking functions, video processing functions and video analysis functions. A net- work camera typically may have its own IP address so that it may be connected to a network through a wireless or wired connection. The network cameras 26a and 26b depicted in FIGS. 1A, 1B, and 1C may be configured to transmit video data to video gateway devices 24a and 24b, respectively.

Video gateway modules 22a and 22b each include memory configured to video client applications 8. The video client application 8 may be programmed in a run-time environment. The run-time environment may be JavaScript, for example, node.js. respectively. Video client application 8 28a and 28b include instructions when executed by a processor included in each video gateway modules 22a and 22b perform video streaming functions and other functions as set forth herein.

Server network 16 may include application containers. The application containers may be used to deploy and run distributed applications without launching an entire virtual machine for each application within the container. Each of the containerized applications may be executed on a single host and may be configured to access the same operating system (OS) kernel. Each application container may include a set of runtime components, e.g., files, environment vari- ables and libraries, to perform application functions upon execution of the runtime components. In one or more variations, the set of runtime components to execute in an application container may be an image. A container engine deploys these images on server network 16 or another host. In one or more variations, the engines may be Kubernetes engines.

Web service proxy container 30 may be in communication with web service client containers 32a and 32b. Virtual camera containers 34a and 34b may be in communication with web service client containers 32a and 32b, respectively. Virtual camera container 34a may be in communication with recorder container 36a, thumbnails container 38a, and ana- lytics container 40a. Virtual camera container 34b may be in communication with recorder container 36b, thumbnails container 38b, and analytics container 40b. Data storage medium 42 stores recorded video data received from recorder containers 36a and 36b and thumbnail video data received from thumbnails containers 38a and 38b. Live video transcoding container 44 may be in communication with virtual camera container 34a. Video encoders 46a and 46b may be in communication with data storage medium 42. Application programming interface (API) container 48 may be in communication with video encoders 46a and 46b. Live video transcoding container 44 and API container 48 may be in communication user computers 52a, 52b and 52n through external communication network 50.

Web server proxy container 30 may include a container engine configured to execute a container image to connect user computers 52a, 52b and 52n with network cameras 24a and 26a based on a proxy protocol. The proxy protocol may be configured to carry connection information from the user computers 52a, 52b and 52n to video gateway devices 22a and 22b when those devices requested the connection. User computers 52a, 52b and 52n may use a real time streaming protocol (RTSP). The proxy protocol of the server proxy container 30 may be configured to support RTSP, as well as other protocols, such as real time transport protocol (RTP) or HTTPS. In one or more variations, components of the container image may be programmed in a run-time envi- ronment. The run-time environment may be JavaScript, for example, node.js.

Figure 2:
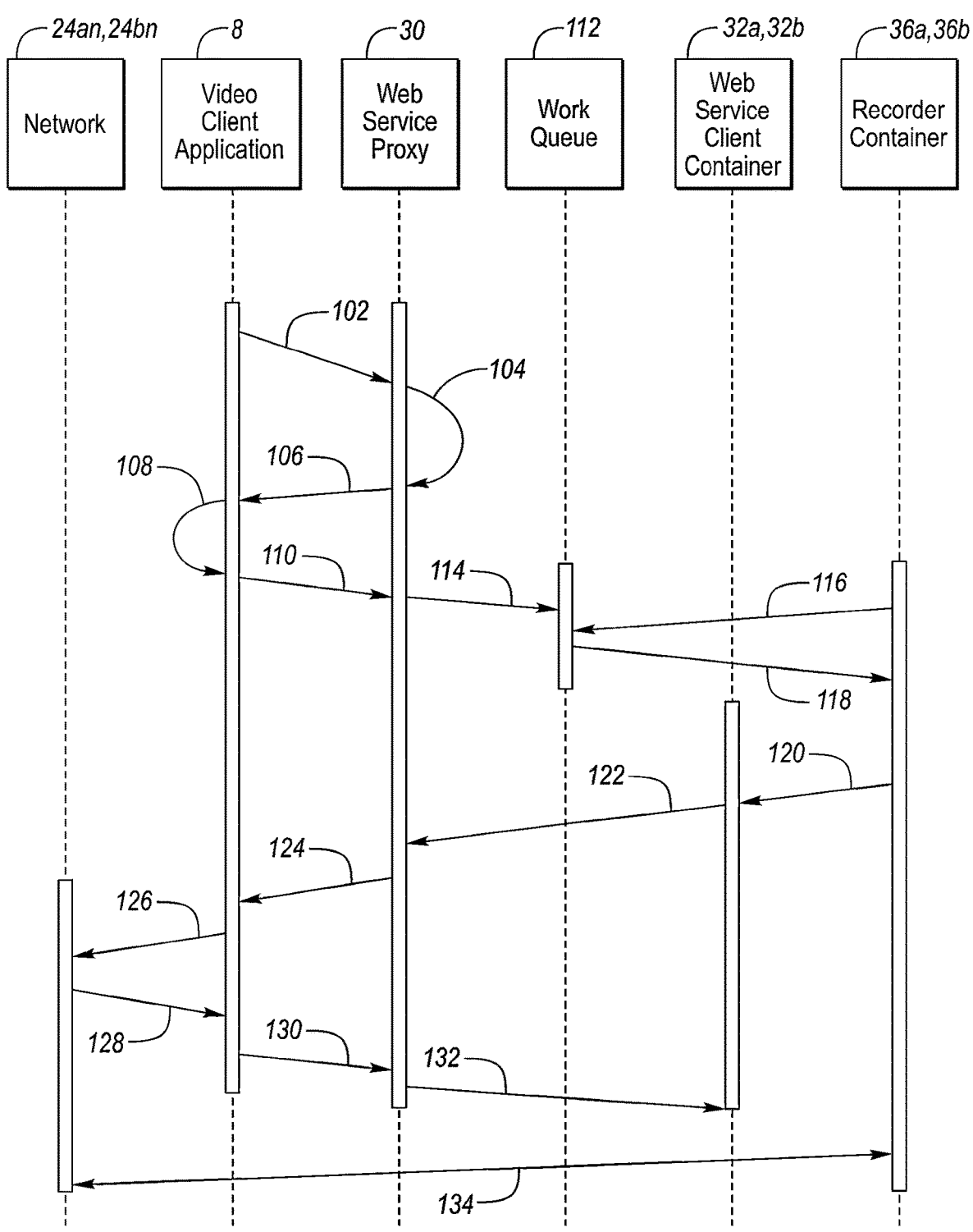
FIG. 2 depicts a sequence diagram of a web service proxy protocol according to one variation.

FIG. 2 depicts a sequence diagram of a web service proxy protocol 100 that may be executed by the engine of the web service proxy container 30 and video gateway devices 22a and 22b according to one variation. As shown by arrow 102, video client application 8 initiates a connection to web server proxy container 30. The connection may be estab- lished through HTTPS by checking the certificate of the video client application 8, as shown by arrow 104. Once the connection may be established, it may be upgraded to a websocket connection. This initial connection may stay open during the entire sequence of the web service proxy protocol. The initial connection may be used by web server proxy container 30 to send requests for tunnels to video client applications 8. The initial connection may also be used by video client applications 8 to notify web server proxy container 30 that video client applications 8 have detected one or more network cameras on client network 12.

At arrow 106, web service proxy container 30 assigns a scan for network cameras to video gateway devices 22a and/or 22b. At arrow 108, video gateway devices 22a and/or 22b perform a scan of client network 12 to determine the presence of any network cameras (e.g., network cameras 24a and 24b). The results of the network scan may be transmitted by video gateway devices 22a and/or 22b to web service proxy container 30, as depicted by arrow 110. Web service proxy container 30 adds available network cameras to a work queue 112 as depicted by arrow 114.

As depicted by arrow 116, recorder containers 36a and/or 36b may be configured to check work queue 112 for avail- able network cameras. In response, work queue 112 trans- mits a message to recorder containers 36a and/or 36b including a list of available network cameras, as depicted by arrow 118. After the available network cameras may be transmitted, recorder containers 36a and/or 36b transmits a video request to web service client containers 38a and/or 38b, respectively, as represented by arrow 120. Upon receiv- ing the video data request, web service client containers 32a and/or 32b request a tunnel from web service proxy con- tainer 30, as depicted by arrow 122. Upon the web service proxy container 30 receiving the tunnel request, the web service proxy container 30 requests the tunnel from the video gateway devices 22a and/or 22b, respectively, as depicted in arrow 124. In sum, gateway devices 22a and 22b may be configured to establish a tunnel with network cameras, as depicted in arrow 126.

As depicted by arrow 128, the tunnel may be opened between one or more network cameras and video gateway devices 22a and/or 22b. The tunnel may be then offered to web service proxy container 30 by video gateway devices 22a and 22b, depicted by arrow 130. In turn, as depicted by arrow 132, web service proxy container 30 offers the tunnel to web service client containers 32a and/or 32b. As shown by arrow 134, RTSP traffic may be established between one or more network cameras and recorder containers 36a and/or 36b.

In certain variations, when web service proxy container 30 may be notified of a network camera at client site 14 (e.g., at arrow 110), web service proxy container 30 sends a tunnel request to the video gateway devices 22a and/or 22b (e.g., at arrow 124). This tunnel request may be made using the initial connection. Video gateway devices 22a and/or 22b determine if the tunnel request may be valid. If the tunnel request may be valid, then video gateway devices 22a and/or 22b open a second secure protocol connection (e.g., HTTPS connection) to the web service proxy container 30. In one or more variations, the second connection may be upgraded to a websocket connection. This second connection may be used to transmit network traffic between the network camera (s) and recorder containers 36a and/or 36b (e.g., arrow 134).

After the second connection has been opened, a listening port may be opened on server network 16 at web service client containers 32a and 32b. The listening port transmits all traffic it receives from virtual camera containers 34a and 34b to the applicable network camera at client site 14. In one or more variations, only Internet connectivity may be necessary to transmit traffic between network camera(s) and recorder containers 36a and/or 36b. No other network considerations (e.g., firewalls) may be necessary because the video management system 10 only initiates Internet connections (e.g., HTTPS connection) to server network 16, e.g., web service proxy container 30. The process associated with web service proxy protocol 100 shown in FIG. 2 may be transparent to client applications executed on the cloud. Web service client containers 32a and 32b automatically buffer data until the tunnel created by the process described above may be ready, which lets any standard video processing software treat the port as if it was opened directly to the camera. Video recording software designed to connect directly to network camera may be used to record video data and streams from the network camera. Examples of the video recording software include the software stored in recorder containers 36a and 36b.

Figure 3A:
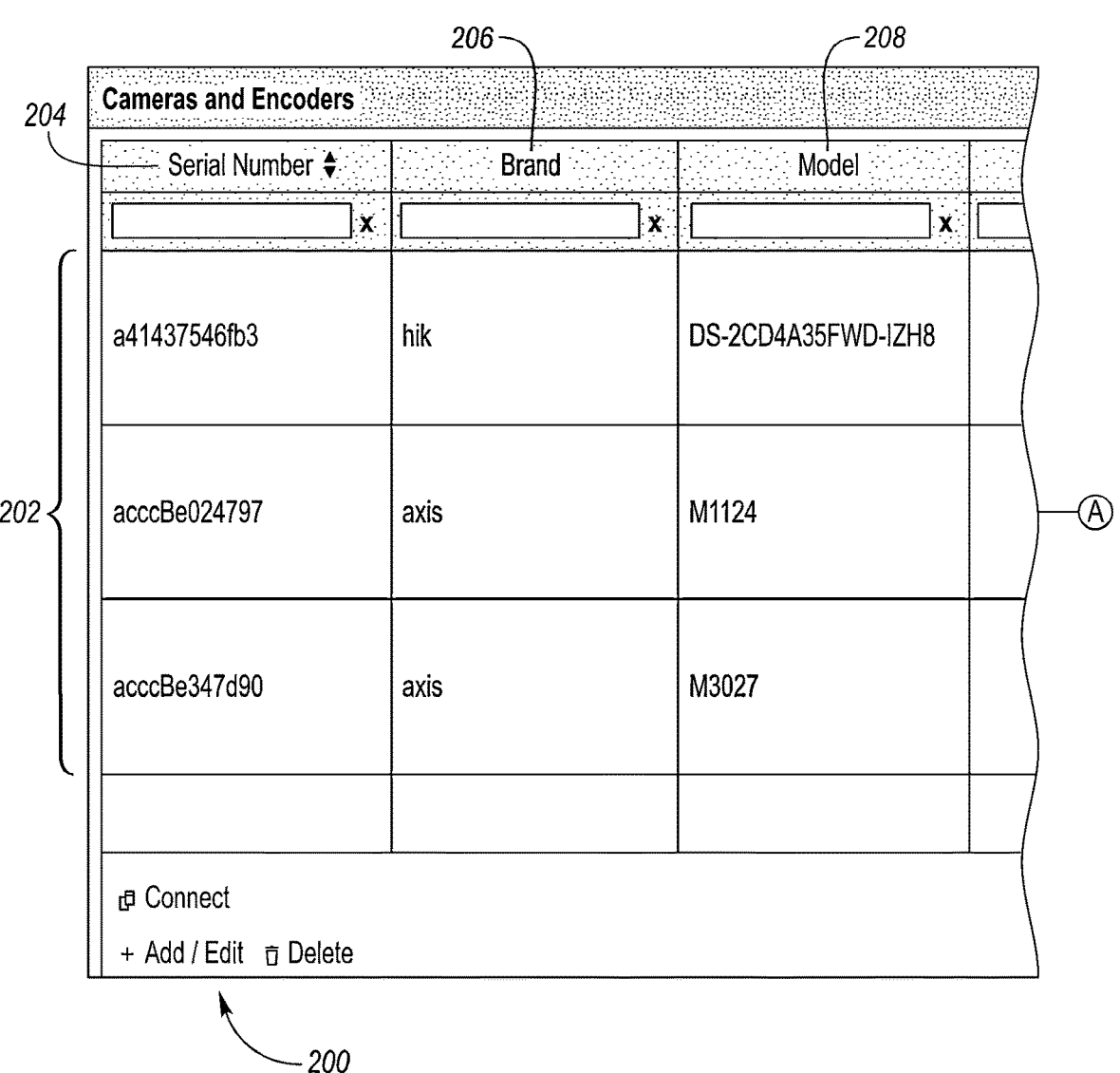
FIGS. 3A and 3B depict a graphical user interface ("GUI") for registering, organizing and updated network cameras installed on a video management system according to one variation.
Figure 3B:
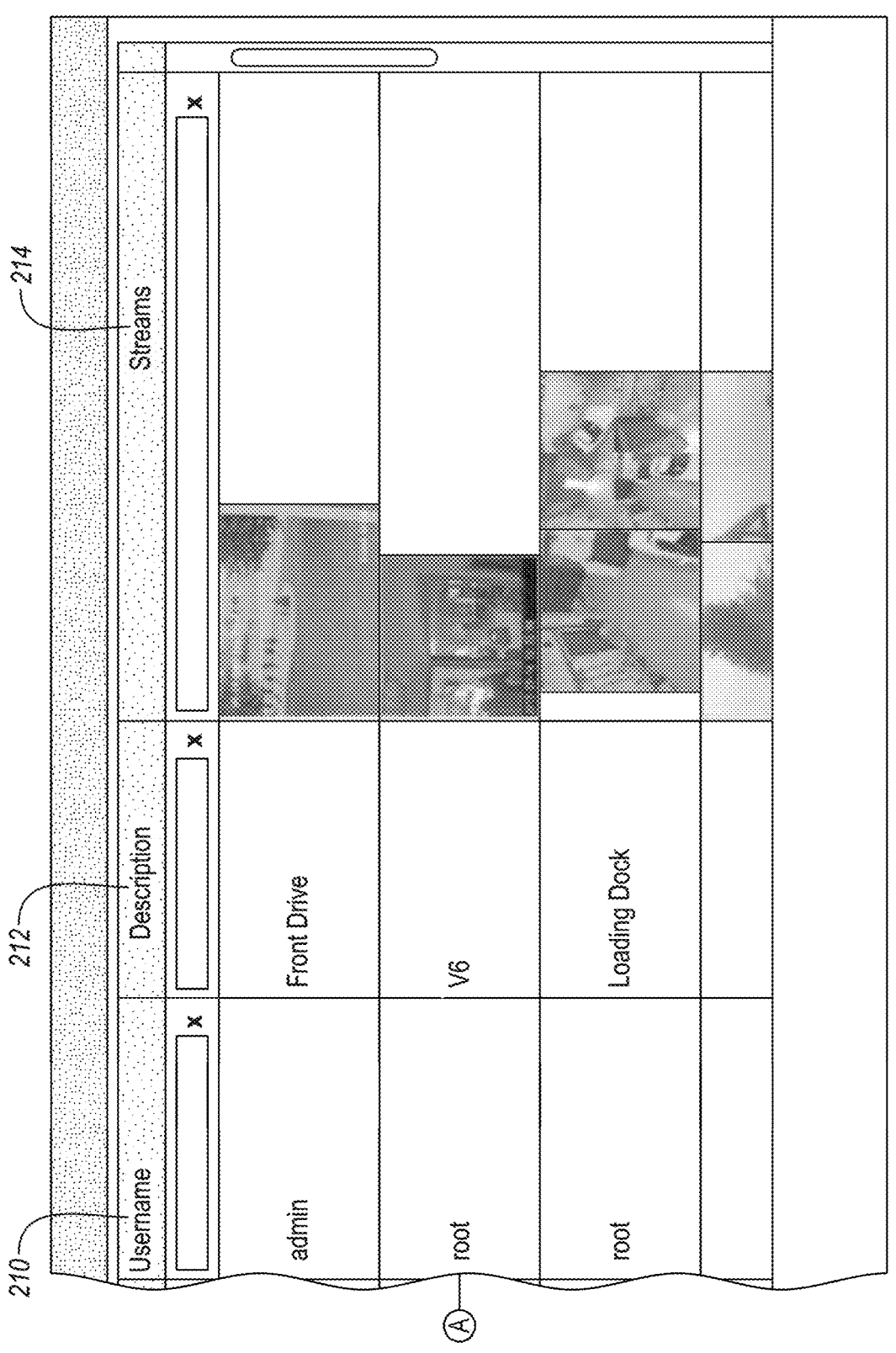

FIGS. 3A and 3B depict a graphical user interface ("GUI") 200 for registering, organizing and updated network cameras installed on a video management system according to one variation. In one variation, API container 48 may include an image that may be configured to be executed by an engine to perform queries to obtain the video data streams displayed through GUI 200. GUI 200 may include a list 202 of network cameras and encoders for a subscriber or client of video management system 10. The network cameras and/or encoders may be connected to video gateway devices 22a or 22b and server network 16 to facilitate the subscriber's or client's viewing of video streams from a user computer. Serial number 204, brand name 206, model 208, username 210, description 212, and live thumbnail live stream 214 may be displayed in GUI 200 for each camera or encoder in list 202.

Figure 4:
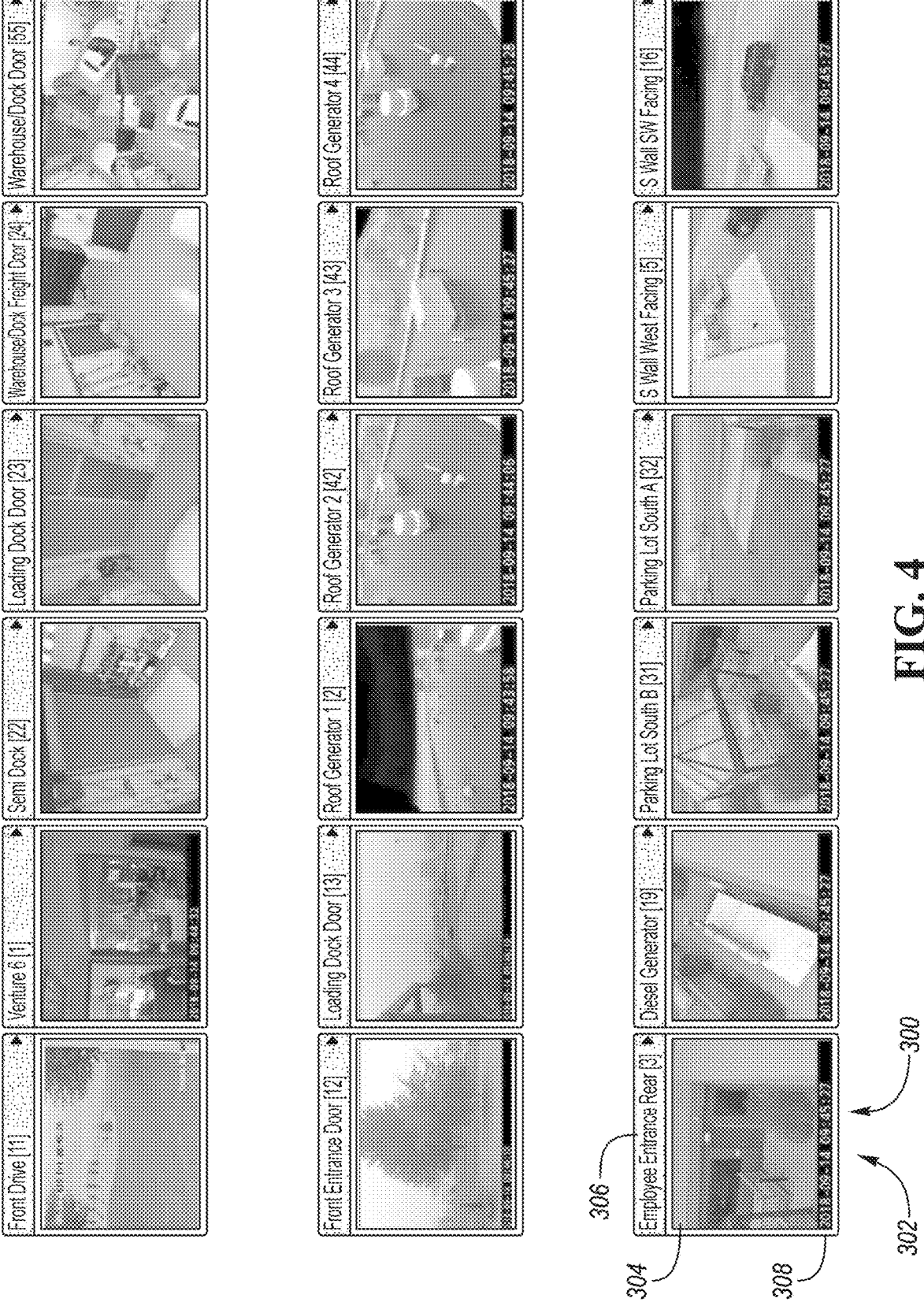
FIG. 4 depicts a GUI for viewing video data streams from network cameras installed on a video management system according to one variation.

FIG. 4 may be a GUI 300 for viewing video data streams from network cameras installed on a video management system according to one variation. In one variation, API container 48 may include an image that may be configured to be executed by an engine to retrieve a list of cameras and transcoding container 44 may include an image that may be configured to be executed by an engine to view the video data streams through GUI 300. GUI 300 may include a matrix 302 of thumbnail windows 304. Each thumbnail window 304 may include a video data stream from a network camera. The video data stream may be a live video data stream so that the user may react to situations developing in real-time. The video data stream may also be a recorded video data stream. A label 306 may be situated above each window and may include a description of the video data stream at a client site 14. Non-limiting examples include "front drive," "semi dock," "diesel generator," and "roof generator." A time stamp 308, including date and time in HH:MM:SS format, may be situated below each window 304. While a 6 by 3 matrix of windows 304 may be shown in FIG. 4 the number of windows 304, including the number of rows and columns, may be customizable by the user. GUI 300 may be configured such that each thumbnail window 304 may be expanded so that the user may obtain a more detailed view of the video data stream.

Figure 5:
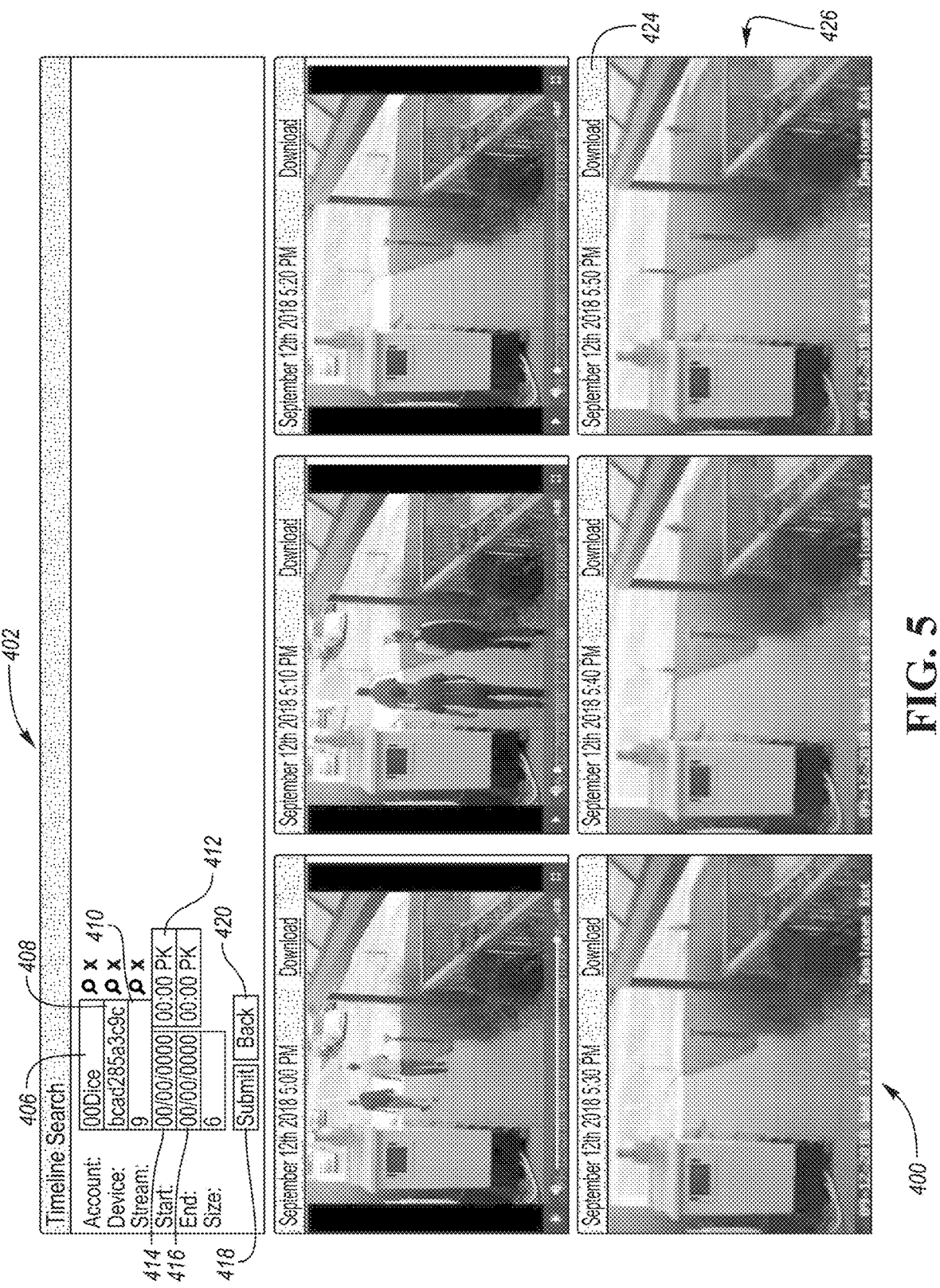
FIG. 5 depicts a GUI for conducting a timeline search of video data streams from network cameras installed on a video management system according to one variation.

FIG. 5 may be a GUI 400 for conducting a timeline search of video data streams from network cameras installed on a video management system according to one variation. In one variation, API container 48 may include an image that may be configured to be executed by an engine to query data storage medium 42 for a list of thumbnails and to submit a video encoding request to encoder containers 46a and 46b. GUI 400 may include timeline search window 402 and data stream windows matrix 404. Timeline search window 402 may include data input fields for account 406, device 408, stream number 410, start date and time 412, end date and time 414, and size 416. Timeline search window 402 also may include submit button 418 and back button 420. A user inputs the account name in account data input field 406. The user inputs the device number in device data input field 408. The user inputs the stream (e.g., that correlates to one of the network cameras) into stream data input field 410. The user inputs a start date and time in HH:MM am/pm format in start date and time input field 412. The user inputs an end date and time in HH:MM am/pm format in start date and time input field 414. The user inputs size in size data input field 416. In the example shown in FIG. 5, the difference between the start and end time may be 1 hour and the size may be 6. Once all the data may be input into data input fields 406 through 416, the user clicks the submit button 418 to perform a timeline search. Accordingly, the data stream windows matrix 404 shows six window with a time slice every ten (10) minutes within between the start and stop times (e.g., sixty (60) minutes divided by 6). Each window 422 within matrix 404 may include a time stamp portion 424 including a download link configured to download the associated thumbnail image and streaming, and window portion 426 configured to display a thumbnail image and a video data stream starting at the start time identified in the time stamp portion 424. Advantageously, the timeline search window enables the user to pinpoint the exact timeframes of events and narrow a user's search with interactive thumbnail slices.

Figure 6A:
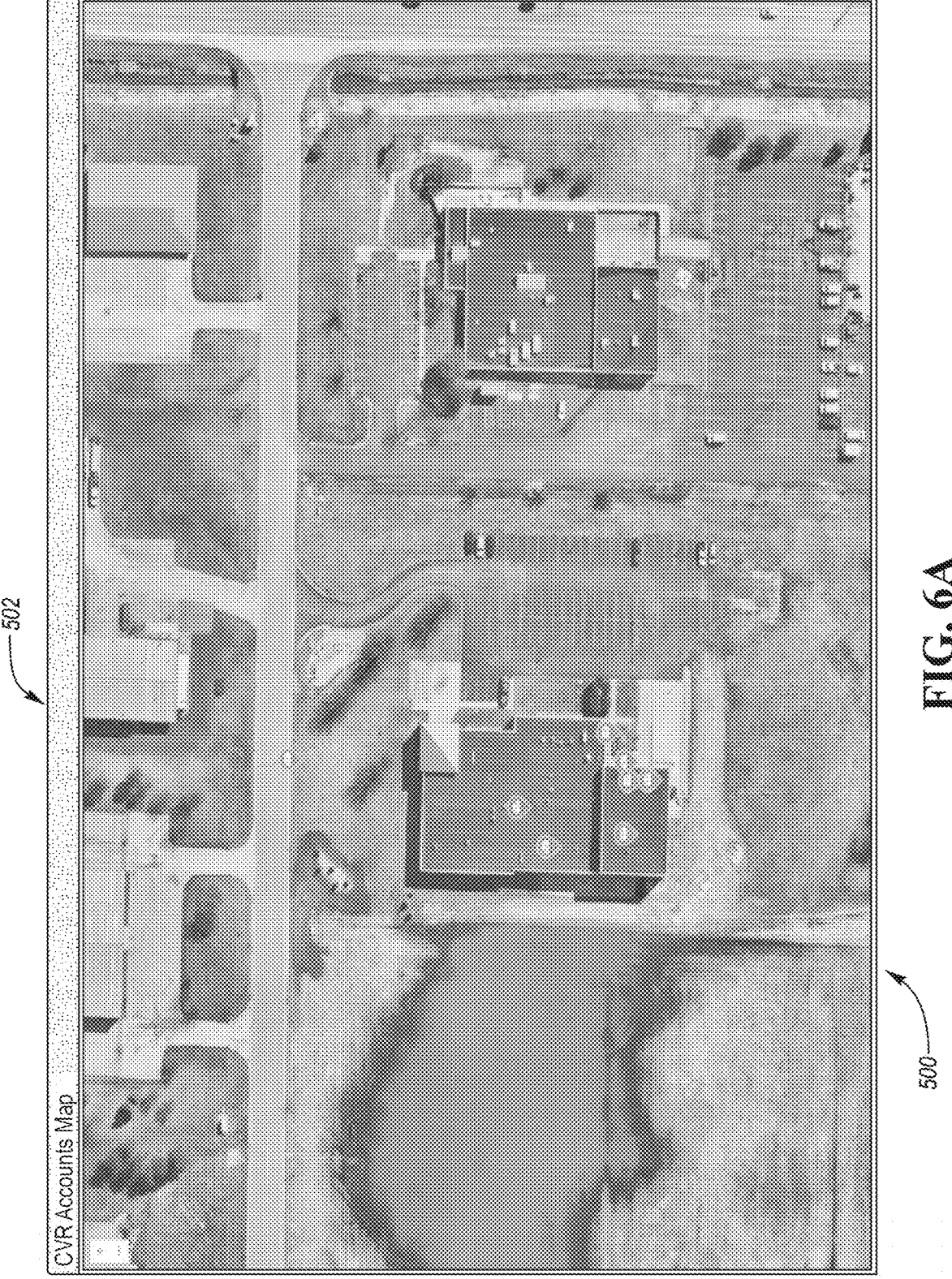
FIGS. 6A and 6B depict a GUI for viewing applicable client sites and installed network cameras via a map screen.
Figure 6B:
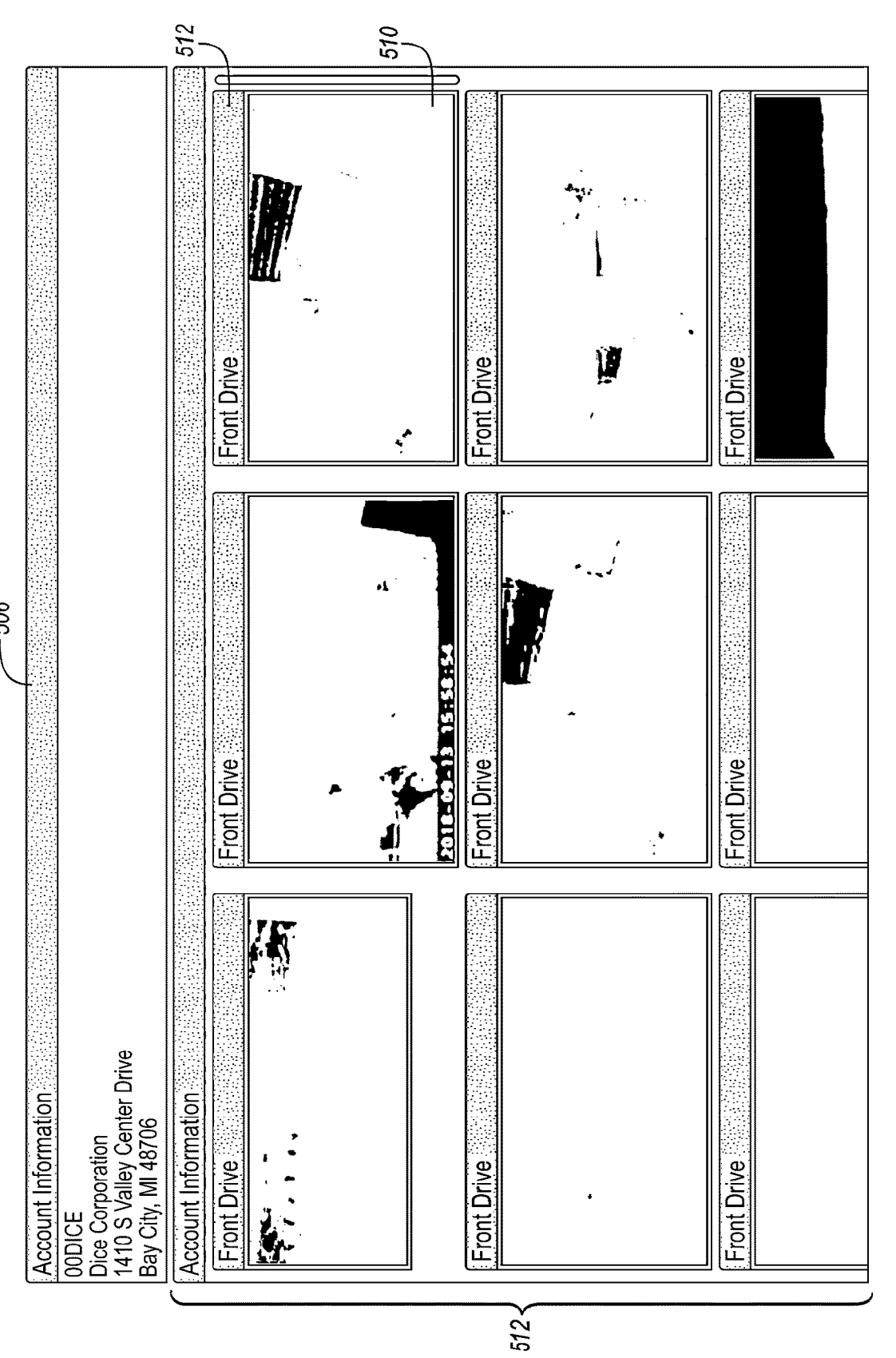

FIGS. 6A and 6B depict a GUI 500 for viewing applicable client sites and installed network cameras via a map screen. In one variation, API container 48 may include an image that may be configured to be executed by an engine to query a database to retrieve and plot the latitude and longitude as entered by the user and associated with the video data stream. GUI 500 may include network camera digital map 502 including the locations 504 of network cameras at a client site 14. GUI 500 also may include an account information window 506 including account information for the user. GUI 500 may include a matrix 508 of thumbnail windows 510. Each thumbnail window 510 may include a video data stream from a network camera. The video data stream may be a live video data stream so that the user may react to situations developing in real-time. The video data stream may also be a recorded video data stream. A label 512 may be situated above each window and may include a description of the video data stream at a client site 14. Non-limiting examples include "front drive," "semi dock," "diesel generator," and "roof generator." A time stamp 514, including date and time in HH:MM:SS format, may be situated below each window 510. While a 3 by 3 matrix of windows 510 may be shown in FIG. 6 the number of windows 510, including the number of rows and columns, may be customizable by the user. GUI 500 may be configured such that each thumbnail window 510 may be expanded so that the user may obtain a more detailed view of the video data stream. Advantageously, map GUI 500 enables the user to view satellite images of different client sites 14 and stream real time thumbnail videos of all network camera at each location.

Figure 7A:
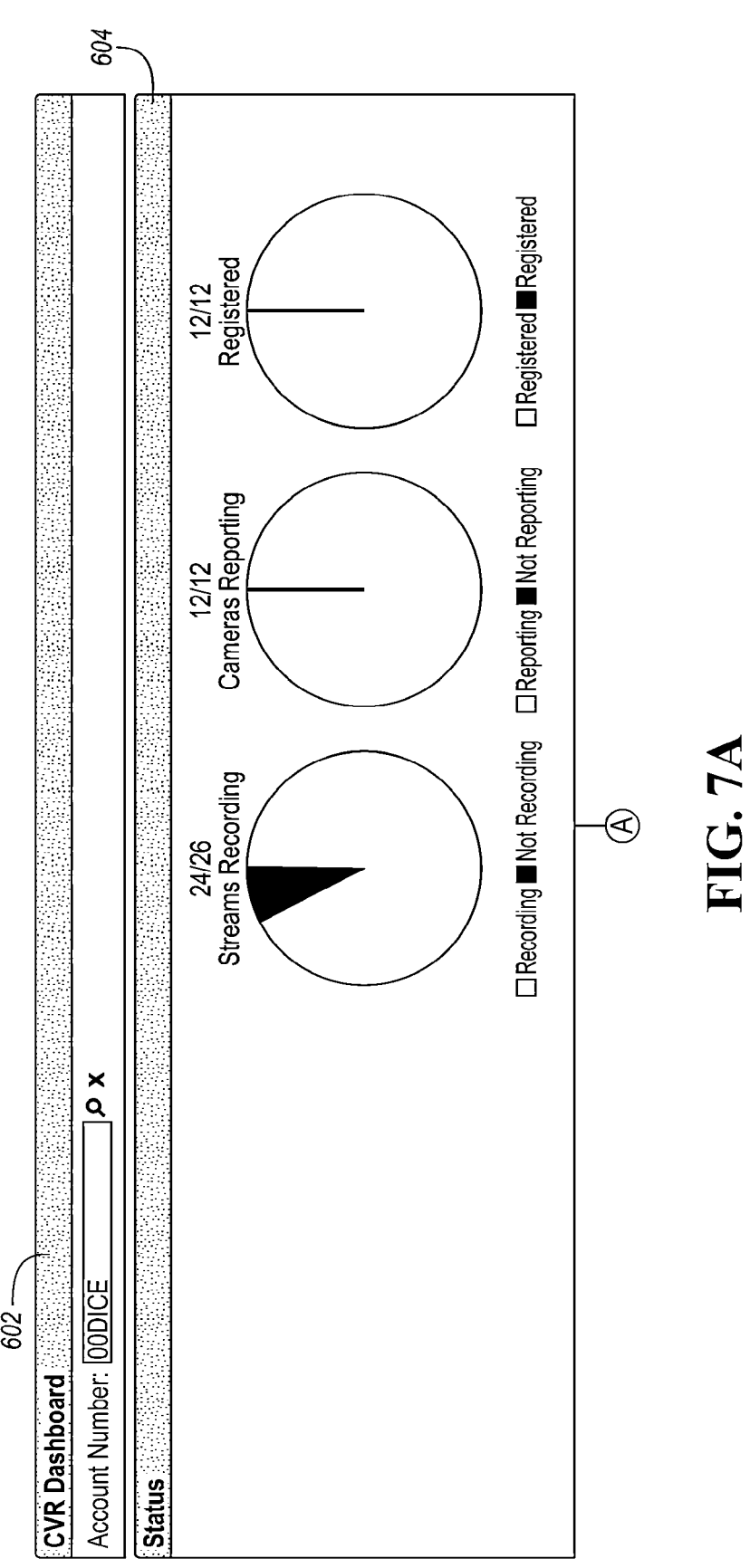
Figure 7C:
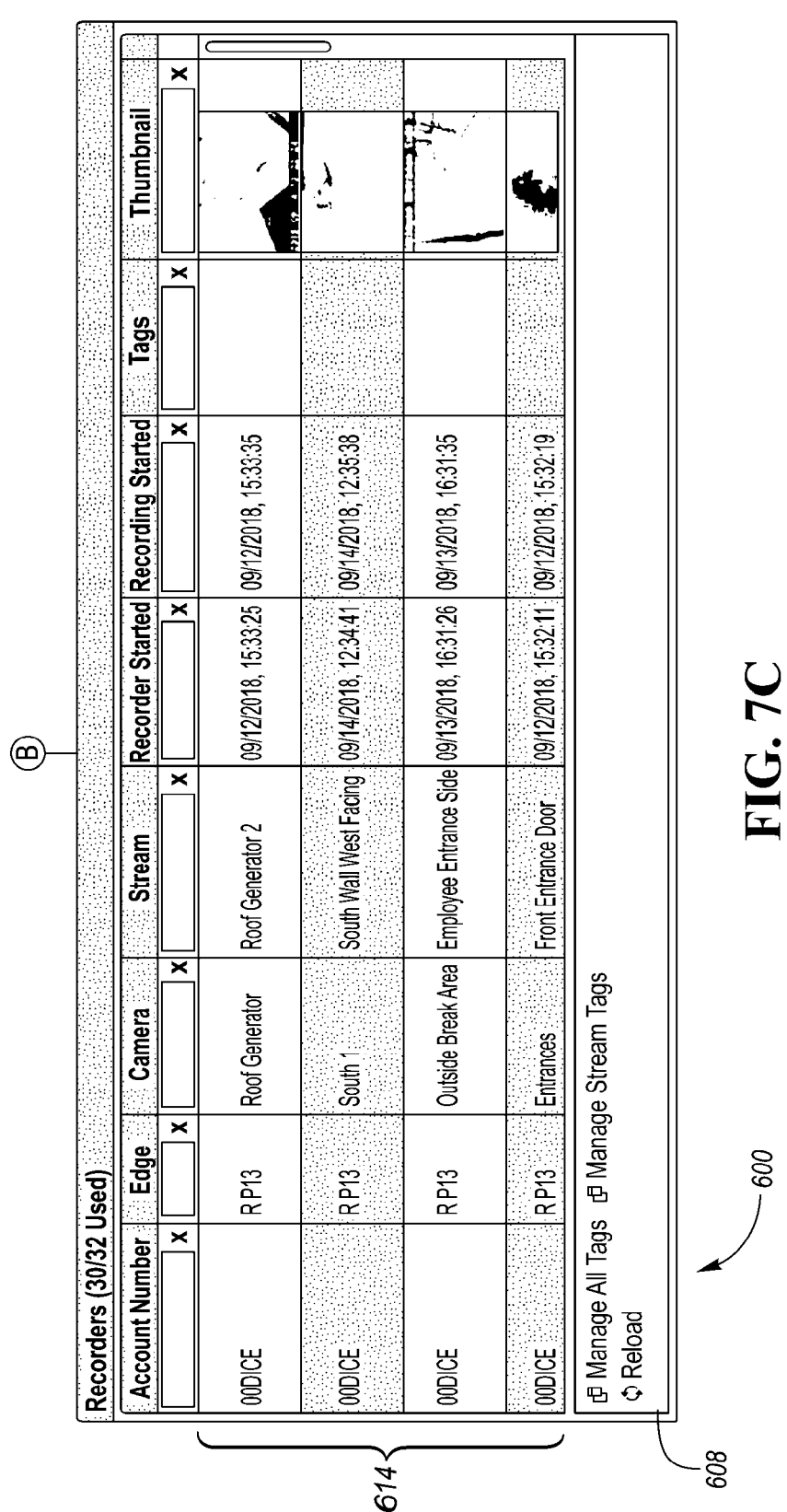

FIGS. 7A, 7B, and 7C depict a GUI 600 for displaying a dashboard including information to analyze and restore installed network cameras and monitor access to installed video cameras. In one variation, API container 48 may include an image that may be configured to be executed by an engine to query a database, a work queue, embedded APIs in recorder containers 36a and 36b, recorder web service proxy container 30, and transcoding container 44. The queried data may be displayed through GUI 600. GUI 600 may include account number window 602, status window 604, live stream 606, and recorder window 608. Account number window 602 may include a data entry field 610 for an account number of a user. Status window 604 may include statistics regarding streams recording, cameras reporting and registered cameras. Live streams window may include a list 612 of live streams for a user. Each live stream may include the following non-limiting information: user, account number, edge, camera, stream and stream started date and time. Recorders window 608 may include a list 614 of recorders or other network cameras. Each recorder listed may include the following non-limiting information: account number, edge, camera, stream recorder started, recording started, tags, and thumbnail. Advantageously, dashboard GUI 600 enables users to analyze and restore devices and monitor employee access.

Figure 8A:
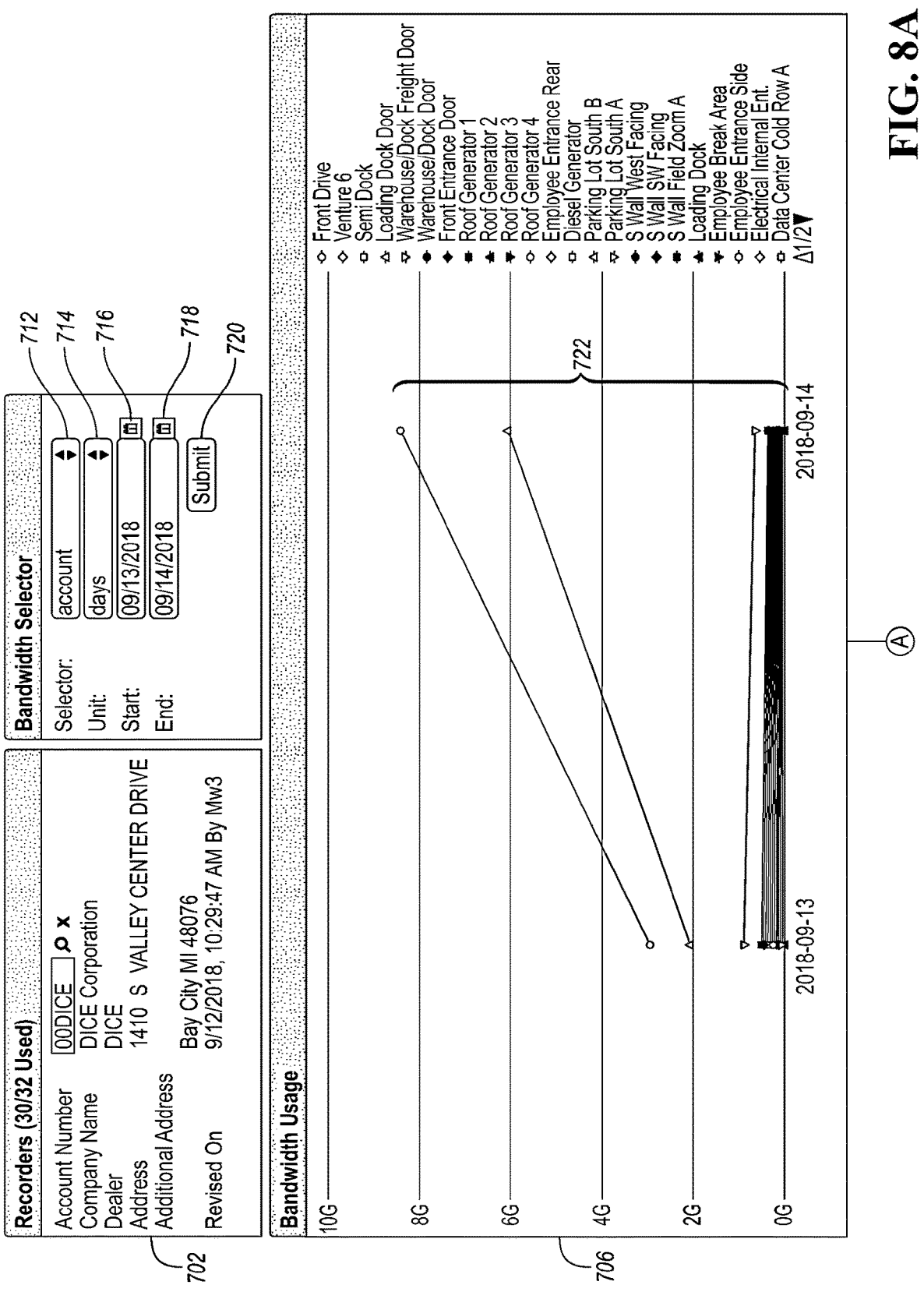

FIGS. 8A and 8B depict a GUI 700 for displaying a bandwidth information to identify potential network traffic issues on the video management system and to manage data usage on the video management system. In one variation, API container 48 may include an image that may be configured to be executed by an engine to query bandwidth data recorded in virtual camera containers 34a and 34b. The queried data may be displayed through GUI 700. GUI 700 may include select subscriber window 702, bandwidth selector window 704, bandwidth usage window 706, and gateway bandwidth window 708. Select subscriber window 702 may be configured to enable a user to input an account number through account number data input field 710. Bandwidth selector window 706 may include data input fields for selector type 712 (e.g., account number), time unit 714, start date 716, and end date 718. Bandwidth selector window 706 also may include a submit button 720. After the user inputs date into data input fields 712 through 718, then user selects submit button 720 so that the data meeting the data input fields 712 through 718 may be displayed bandwidth usage window 706 and gateway bandwidth window 708. Bandwidth usage window 706 displays a graph 722 that plots the amount of bandwidth used by each network camera versus time from the start time to end time. Gateway bandwidth window 708 displays a list 724 of network cameras. For each network camera, the network camera name and bandwidth used on the start and ends dates may be displayed. Bandwidth GUI 700 enables users to identify potential network issues and manage data issues as needed.

A computer system for networked video management is disclosed. The computer system may include a computer having non-transitory memory for storing machine instructions that may be to be executed by the computer. The machine instructions when executed by the computer implement the following functions: scanning a network for network cameras connected to the network to obtain a list of connected network cameras; transmitting the list of connected network cameras; receiving a tunnel request between the connected network cameras on the list and a video recorder application; establishing a tunnel with each connected network camera; and offering the tunnel to applications on the network.

A computer system for networked video management is disclosed. The computer system may include a computer having non-transitory memory for storing machine instructions that may be to be executed by the computer. The machine instructions when executed by the computer implement the following functions: requesting a scan of a network for network cameras connected to the network; receiving a list of connected network cameras; transmitting a tunnel request between the connected network cameras on the list and a video recorder application; receiving a tunnel offer in response to transmitting the tunnel request; and offering the tunnel to applications on the network.

A computer readable medium having non-transitory memory for storing machine instructions that may be to be executed by the computer may be disclosed. The machine instructions when executed by the computer implements the following functions: scanning a network for network cameras connected to the network to obtain a list of connected network cameras; transmitting the list of connected network cameras; receiving a tunnel request between the connected network cameras on the list and a video recorder application; establishing a tunnel with each connected network camera; and offering the tunnel to applications on the network.

A method for networked video management is disclosed. The method may include scanning a network for network cameras connected to the network to obtain a list of connected network cameras; transmitting the list of connected network cameras; receiving a tunnel request between the connected network cameras on the list and a video recorder application; establishing a tunnel with each connected network camera; and offering the tunnel to applications on the network.

Variation 1 may include a product comprising a computer system for networked video management, the computer system comprising at least one computer having non-transitory memory for storing machine instructions that may be executed by the computer, the machine instructions when executed by the computer may implement functions. The functions may include scanning a network for network cameras connected to the network to obtain a list of connected network cameras; transmitting the list of connected network cameras; receiving a tunnel request between the connected network cameras on the list and a video recorder application; establishing a tunnel with each connected network camera; and offering the tunnel to applications on the network.

Variation 2 may include a product as set forth in variation 1, and may further include initiating a connection to a web server proxy container established through a secure hypertext transfer protocol prior to scanning a network for network cameras connected to the network to obtain a list of connected network cameras.

Variation 3 may include a product as set forth in any of variations 1 and 2, wherein initiating a connection to a web server proxy container established through a secure hypertext transfer protocol may further include checking a certificate of a video client application and upgrading the connection to a websocket connection.

Variation 4 may include a product as set forth in any of variations 1-3, wherein the websocket connection may be constructed and arranged to transmit network traffic between the network cameras and at least one recorder container.

Variation 5 may include a product as set forth in any of variations 1-4, wherein the network for network cameras may further include a client-side network; a server network virtually residing on a cloud instance; and wherein the client-side network and the server network may be in communication with one another over the network for network cameras.

Variation 6 may include a product as set forth in any of variations 1-5 and may further include opening a listening port on the server network at least one web service client container and transmitting all traffic the listening port receives from at least one virtual camera containers to the corresponding network camera.

Variation 7 may include a product as set forth in any of variations 1-6 wherein the at least one computer having non-transitory memory for storing machine instructions may be at least one server side computer.

Variation 8 may include a product as set forth in any of variations 1-7 and may further comprise at least one video gateway device constructed and arranged to act as a gate between a client network and a server network to enable network traffic flow between the client network and the server network.

Variation 9 may include a product as set forth in any of variations 1-8 may further comprise establishing real time streaming protocol traffic between the connected network cameras and the video recorder application.

Variation 10 may include a computer system for networked video management, the computer system comprising at least one computer having non-transitory memory for storing machine instructions that are to be executed by the computer, the machine instructions when executed by the at least one computer implement functions. The functions may include requesting a scan of a network for network cameras connected to the network; receiving a list of connected network cameras; transmitting a tunnel request between the connected network cameras on the list and a video recorder application; receiving a tunnel offer in response to transmitting the tunnel request; and offering the tunnel to applications on the network.

Variation 11 may include a product as set forth in variation 10, and may further include initiating a connection to a web server proxy container established through a secure hypertext transfer protocol prior to scanning a network for network cameras connected to the network to obtain a list of connected network cameras, Variation 12 may include a product as set forth in variations 10-11, wherein initiating a connection to a web server proxy container established through a secure hypertext transfer protocol may further comprise checking a certificate of a video client application and upgrading the connection to a websocket connection.

Variation 13 may include a product as set forth in variations 10-12, may further include establishing real time streaming protocol traffic between the connected network cameras and the video recorder application.

Variation 14 may include a product as set forth in variations 10-13, wherein the network for network cameras may further comprise a client-side network; a server network virtually residing on a cloud instance; and wherein the client-side network and the server network may be in communication with one another over the network for network cameras.

Variation 15 may include a product as set forth in variations 10-14, wherein the at least one computer having non-transitory memory for storing machine instructions may be at least one server side computer.

Variation 16 may include providing at least one computer having non-transitory memory for storing machine instructions that are to be executed by the at least one computer, the machine instructions when executed by the at least one computer implements functions. The functions may include initiating a connection to a web server proxy container via a video client application; scanning a network for network cameras connected to the network to obtain a list of connected network cameras; transmitting the list of connected network cameras to the web server proxy container; requesting a tunnel from the web service proxy container via the at least one recorder container and from at least one video gateway device via the web service proxy container; establishing the tunnel with the network of network cameras via the at least one video gateway device; offering the tunnel to the web service proxy container via the at least one video gateway device; offering the tunnel to the web service client container via the web service proxy container; and establishing real time streaming protocol traffic.

Variation 17 may include a method as set forth in variation 16 and may further comprise initiating a connection to a web server proxy container established through a secure hypertext transfer protocol prior to scanning a network for network cameras connected to the network to obtain a list of connected network cameras.

Variation 18 may include a product as set forth in variations 16-17, wherein initiating a connection to a web server proxy container established through a secure hypertext transfer protocol may further comprise checking a certificate of a video client application and upgrading the connection to a websocket connection.

Variation 19 may include a product as set forth in variations 16-18, wherein the at least one computer having non-transitory memory for storing machine instructions may be at least one server side computer.

Variation 20 may include a product as set forth in variations 16-19, wherein the network for network cameras may further comprise a client-side network; a server network virtually residing on a cloud instance; and wherein the client-side network and the server network may be in communication with one another over the network for network cameras.

As required, detailed variations of the present invention are disclosed herein; however, it may be to be understood that the disclosed variations may be merely exemplary of the invention that may materialize in various and alternative forms. The figures may be not necessarily to scale; some features may be exaggerated or minimized to show details of particular components. Therefore, specific structural and functional details disclosed herein may be not to be interpreted as limiting, but merely as a representative basis for teaching one skilled in the art to variously employ the present invention.

While exemplary variations may be described above, it may be not intended that these variations describe all possible forms of the invention. Rather, the words used in the specification may be words of description rather than limitation, and it may be understood that various changes may be made without departing from the spirit and scope of the invention. Additionally, the features of various implementing variations may be combined to form further variations of the invention.

What is claimed is:

1. A product comprising:
a network management computer system comprising at least one computer having non-transitory memory configured to store machine instructions that are to be executed by the at least one computer, the machine instructions when executed by the computer implement the following web service client functions:
receiving a data request at a web service client from a data recorder container;
upon receiving the data request, initiating a secure hypertext transfer protocol (HTTPS) connection to a web service proxy container;
requesting a tunnel from the web service proxy container;
receiving an offer of the tunnel from the web service proxy container, the tunnel is established between a video gateway device and a network camera at a client site; and
opening a listening port to transmit traffic between a network device at a client site and the data recorder container using an Internet connection without a firewall.

2. The product of claim 1, wherein the network management computer system is a server network management computer system.

3. The product of claim 2, wherein the server network management computer system resides on a cloud instance.

4. The product of claim 1, wherein the web service proxy resides on a cloud instance.

5. The product of claim 1, wherein the web service client is a web service client container.

6. The product of claim 1, wherein the web service proxy is a web service proxy container.

7. The product of claim 1, wherein the receiving the offer function includes receiving the offer of the tunnel from the web service proxy to establish real time streaming protocol (RTSP) traffic between at least one network device and at least one recorder container.

8. The product of claim 1, wherein the at least one computer implements the following further function: automatically buffer data until the tunnel is created.

9. The product of claim 1, wherein the upon receiving function includes upon receiving the data request, upgrading the connection to a websocket connection.

10. The product of claim 9, wherein the requesting function includes requesting the tunnel from the web service proxy container via the upgraded websocket connection.

11. The product of claim 1, wherein the machine instructions when executed by the computer further implement the following web service client functions: automatically buffering data until the tunnel is created to enable seamless video stream transmission.

12. A method comprising:
receiving a data request at a web service client from a data recorder container residing on a server network management computer system;
upon receiving the data request, initiating a secure hypertext transfer protocol (HTTPS) connection to a web service proxy container;
requesting a tunnel from the web service proxy container;
receiving an offer of the tunnel from the web service proxy container, the tunnel is established between a video gateway device and a network camera at a client site; and
opening a listening port to transmit traffic between a network device at a client site and the data recorder container using an Internet connection without a firewall.

13. The method of claim 12, wherein the web service proxy is a web service proxy container.

14. The method of claim 12, wherein the receiving the offer function includes receiving the offer of the tunnel from the web service proxy to establish real time streaming protocol (RTSP) traffic between at least one network device and at least one recorder container.

15. The method of claim 12, further comprising automatically buffering data until the tunnel is created.

\* \* \* \* \*